US012191050B2

(12) United States Patent
Mathews

(10) Patent No.: US 12,191,050 B2
(45) Date of Patent: Jan. 7, 2025

(54) WATERPROOF DROP CABLE

(71) Applicant: PPC BROADBAND, INC., East Syracuse, NY (US)

(72) Inventor: Roger Mathews, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 17/891,960

(22) Filed: Aug. 19, 2022

(65) Prior Publication Data

US 2023/0057567 A1 Feb. 23, 2023

Related U.S. Application Data

(60) Provisional application No. 63/234,769, filed on Aug. 19, 2021.

(51) Int. Cl.

*H01B 11/18* (2006.01)
*H01B 7/282* (2006.01)
*H01R 24/40* (2011.01)

(52) U.S. Cl.

CPC ....... *H01B 11/1895* (2013.01); *H01B 7/2825* (2013.01); *H01R 24/40* (2013.01)

(58) Field of Classification Search

CPC ... H01B 1/12; H01B 1/14; H01B 3/02; H01B 3/04; H01B 7/02; H01B 7/0216; H01B 7/17; H01B 7/18; H01B 7/28; H01B 7/34; H01B 9/02; H01B 11/02; H01B 11/04; H01B 11/06; H01B 11/18; H01B 11/1895;

(Continued)

(56) References Cited

U.S. PATENT DOCUMENTS 3,394,400 A 7/1968 Lamons
3,643,007 A * 2/1972 Roberts .............. H01B 11/1808 174/117 M (Continued)

FOREIGN PATENT DOCUMENTS

CN 209525954 U 10/2019
WO WO 2019/028087 A1 * 2/2019 ........... H01B 13/016

OTHER PUBLICATIONS

International Search Report and Written Opinion dated Nov. 10, 2022 in corresponding International Application No. PCT/US2022/040945, 9 pages.

*Primary Examiner* — William H. Mayo, III
(74) *Attorney, Agent, or Firm* — MH2 TECHNOLOGY LAW GROUP LLP

(57) ABSTRACT

A coaxial cable may include a center conductor; a dielectric insulator configured to surround the center conductor; an inner conductive foil layer configured to surround the dielectric; a braided shield layer configured to surround the inner conductive foil layer; and an outer jacket configured to surround the outer conductive foil layer. The outer conductive foil layer may be bonded to the outer jacket; the outer conductive foil layer may include a first lateral region, a second lateral region, and a sealant; the first and second lateral regions may be configured to overlap each other; the sealant may be disposed between the first lateral region and the second lateral region to form a sealed joint; and the sealed joint may be configured to prevent moisture from passing the outer conductive foil layer and migrating along the coaxial cable, which may prevent signal loss or coaxial cable connector damage.

24 Claims, 11 Drawing Sheets

(58) Field of Classification Search

CPC ...... H01B 11/20; H01B 13/10; H02G 1/1202; H02G 1/14

USPC ... 174/36, 102 R, 105 R, 106 R, 107 R, 115, 174/117 R, 117 M; 333/12, 36, 243, 244; 156/54, 203, 244.23, 466

See application file for complete search history.

(56) References Cited

U.S. PATENT DOCUMENTS

| | | | | | |
|---|---|---|---|---|---|
| 3,662,090 | A * | 5/1972 | Grey | H01B 11/1808 | 174/102 R |
| 4,117,260 | A * | 9/1978 | Wilkenloh | H01B 11/1869 | 174/107 |
| 4,376,920 | A * | 3/1983 | Smith | H01P 3/06 | 174/105 R |
| 4,477,693 | A * | 10/1984 | Krabec | H01B 11/1016 | 174/105 R |
| 4,595,431 | A * | 6/1986 | Bohannon, Jr. | H01B 13/10 | 174/102 C |
| 4,701,575 | A * | 10/1987 | Gupta | H01B 7/2806 | 174/109 |
| 6,246,006 | B1 * | 6/2001 | Hardin | H01B 11/1826 | 174/109 |
| 6,384,337 | B1 * | 5/2002 | Drum | H01B 11/1813 | 174/102 R |
| 10,332,654 | B2 * | 6/2019 | Lawrence | H01B 7/17 | |
| 10,573,980 | B2 | 2/2020 | Mathews | | |
| 2015/0348678 | A1 * | 12/2015 | Montena | H01B 11/1895 | 174/113 R |
| 2018/0025811 | A1 * | 1/2018 | Lawrence | H02G 1/14 | 174/106 R |
| 2021/0142930 | A1 | 5/2021 | Lawrence | | |

* cited by examiner

WATERPROOF DROP CABLE

CROSS-REFERENCE TO RELATED APPLICATION

This application claims the benefit of U.S. Provisional Application No. 63/234,769, filed Aug. 19, 2021, the disclosure of which is hereby incorporated by reference herein in its entirety.

TECHNICAL FIELD

The present disclosure is directed to cable or wiring and, more particularly, to a tri-shield coaxial drop cable with a layer of foil bonded to the outer jacket to stop moisture migration.

BACKGROUND

Conventional coaxial drop cable is installed in outdoor aerial application where one end of the drop cable is attached to a telephone pole while the other end is attached to a customer's building. The cable is exposed to the abrasive effects of rubbing against tress, buildings, and obstructions, and rodent chew that cross the natural path of the cable installation.

The cable that is attached to the telephone pole is typically at a higher elevation than the end of the cable that is at the customer's building. The arrangement allows a natural flow of water to drain down the cable from the higher point to the lower point of the cable, externally and internally. If the jacket has an opening caused by rodent chew, abrasions, or other methods or causes, moisture will enter into the cable and flow or wick down the braid to the lowest point of the installation creating a reservoir of water that enters the connectors/equipment, thereby causing damage to corrosion and/or shorting out the coaxial circuit.

It may be desirable to provide a coaxial cable that prevents moisture that enters the outer jacket from passing through the outer conductive foil layer thereby preventing damage such as corrosion and/or shorting-out a coaxial circuit for the coaxial cable.

SUMMARY

A coaxial cable for providing enhanced protection from moisture leaks includes an inner conductor, a dielectric, an inner conductive foil layer, a braided shield layer, and an outer jacket. The inner conductor may be configured to extend along a longitudinal axis. The dielectric may be configured to coaxially surround the center conductor. The inner conductive foil layer may be configured to coaxially surround the dielectric. The braided shield layer may be configured to coaxially surround the inner conductive foil layer. The outer jacket may be configured to coaxially surround the outer conductive foil layer. The outer conductive foil layer may be bonded to the outer jacket. The outer conductive foil layer includes a first longitudinal edge and a mating region that overlap to form a sealed joint in a region ("overlapping region") where the first longitudinal edge and the mating region overlap each other.

The first longitudinal edge and the mating region are configured to be joined together by a sealant along a length of the first longitudinal edge such that moisture that enters the outer jacket is prevented from passing through the outer conductive foil layer thereby preventing damage such as corrosion and shorting out a coaxial circuit for the coaxial cable. The aforementioned coaxial cable may further include an inner braided shield layer that is adjacent to and encircled by the braided shield layer. The inner conductor may be an elongated center conductor and the dielectric may be an insulator.

In yet another example, a coaxial cable of the present disclosure may alternatively include a braided shield portion, an outer jacket portion, and a sealed outer conductive foil portion. The braided shield portion may be configured to encircle an inner conductive foil portion. The sealed outer conductive foil portion may be bonded to the outer jacket portion and configured to encircle the braided shield portion. The outer jacket portion may be configured to encircle the outer conductive foil portion. The sealed outer conductive foil portion may further include a sealant for joining the first lateral region and the second lateral region of the sealed outer conductive foil to form a sealed joint that prevents external moisture from reaching the braided shield portion thereby preventing damage such as corrosion to the coaxial cable and/or shorting out a coaxial circuit for the coaxial cable. The aforementioned coaxial cable may further include an elongated center conductor, an insulator portion, and an inner braided shield portion wherein the inner braided shield portion may be adjacent to and is encircled by the braided shield portion.

The inner braided foil portion may be an inner conductive foil layer configured to coaxially surround an insulator portion. The insulator portion is configured to surround an inner conductor portion. The inner conductor portion may be an elongated center conductor that extends along a longitudinal axis. The inner braided shield portion may be an inner braided shield layer configured to coaxially surround the inner conductive foil portion. The outer braided shield portion is an outer braided shield layer configured to coaxially surround the inner braided shield portion. The outer conductive foil portion may be an outer conductive foil layer configured to coaxially surround the outer braided shield portion.

A coaxial cable of the present disclosure may alternatively include a braided shield layer, a sealed outer conductive foil layer, and a sealed outer conductive foil portion. The braided shield layer may be configured to encircle an inner conductive foil layer portion. The sealed outer conductive foil portion may be bonded to an outer jacket and configured to encircle the braided shield layer. The sealed outer conductive foil layer may include a sealed joint wherein the sealed outer conductive foil layer to prevent external moisture from reaching the braided shield layer thereby preventing damage such as corrosion and shorting out a coaxial circuit for the coaxial cable. The aforementioned coaxial cable may also include an inner conductive foil layer configured to coaxially surround an insulator. The insulator is configured to surround an inner conductor. The aforementioned coaxial cable may also include an outer jacket that is configured to encircle the outer conductive foil layer.

The inner braided shield portion is an inner braided shield layer configured to coaxially surround the inner conductive foil portion. The outer braided shield portion may be an outer braided shield layer configured to coaxially surround the inner braided shield portion. The outer conductive foil portion may be an outer conductive foil layer configured to coaxially surround the outer braided shield portion. The inner conductor portion comprises an elongated center conductor that extends along a longitudinal axis.

Exemplary embodiments include a coaxial cable for providing enhanced protection from moisture leaks, the coaxial cable including: an inner conductor configured to extend along a longitudinal axis; a dielectric insulator configured to coaxially surround the inner conductor; an inner conductive foil layer configured to coaxially surround the dielectric insulator; an inner braided shield layer configured to coaxially surround the inner conductive foil layer; an outer jacket configured to coaxially surround the outer conductive foil layer; wherein the outer conductive foil layer is bonded to the outer jacket; wherein the outer conductive foil layer includes a first lateral region, a second lateral region and a sealant; and wherein the first lateral region and the second lateral region are configured to overlap each other; wherein the sealant is configured to be disposed between the first lateral region and the second lateral region to form a sealed joint; and wherein the outer conductive foil layer and the sealed joint are configured to prevent moisture that enters the outer jacket from passing the outer conductive foil layer and migrating along the coaxial cable so as to prevent signal loss or damage to a connector that terminates the coaxial cable.

In embodiments, the inner conductor comprises a center conductor.

In embodiments, the inner braided shield comprises an inner braided shield layer.

In embodiments, the coaxial cable further includes an outer braided shield.

In embodiments, the outer conductive foil layer includes an overlapping region wherein the first lateral region and the second lateral region portions overlap each other.

Exemplary embodiments include a coaxial cable providing enhanced protection from moisture leaks, the coaxial cable including: a braided shield portion configured to encircle an inner conductive foil portion; an outer jacket portion; a sealed outer conductive foil portion bonded to the outer jacket and configured to encircle the braided shield portion; wherein the outer jacket portion is configured to encircle the outer conductive foil portion; and wherein the sealed outer conductive foil portion further includes a sealant joining a first lateral region and a second lateral region of the outer conductive foil portion to prevent moisture that enters the outer jacket portion from passing the outer conductive foil portion and migrating along the coaxial cable so as to prevent signal loss or damage to a connector that terminates the coaxial cable.

In embodiments, the inner conductive foil portion comprises an inner conductive foil layer configured to coaxially surround an insulator portion.

In embodiments, the insulator portion is configured to surround an inner conductor portion.

In embodiments, the inner conductor portion comprises a center conductor that extends along a longitudinal axis of the coaxial cable.

In embodiments, the coaxial cable further includes inner braided shield portion configured to coaxially surround the inner conductive foil portion.

In embodiments, the braided shield portion comprises an outer braided shield layer configured to coaxially surround the inner braided shield portion.

In embodiments, the first lateral region and the second lateral region of the outer conductive foil portion are configured to overlap each other in an overlapping region such that the first lateral region and the second lateral region form a sealed joint when the sealant is disposed between the first lateral region and the second lateral region.

Exemplary embodiments include a coaxial cable providing enhanced protection from moisture leaks, the coaxial cable including: a braided shield portion configured to encircle an inner conductive foil portion; a sealed outer conductive foil portion configured to encircle the braided shield portion; and wherein the sealed outer conductive foil portion includes a sealed joint configured to prevent moisture that enters an outer jacket portion from passing the outer conductive foil portion and migrating along the coaxial cable so as to prevent signal loss or damage to a connector that terminates the coaxial cable.

In embodiments, the coaxial cable further comprises the inner conductive foil layer, wherein the inner conductive foil layer is configured to coaxially surround an insulator.

In embodiments, the insulator is configured to surround an inner conductor portion.

In embodiments, the coaxial cable further includes the outer jacket portion, wherein the outer jacket portion is configured to encircle the outer conductive foil portion.

In embodiments, the coaxial cable further includes an inner braided shield layer adjacent to the braided shield layer and encircled by the braided shield layer.

In embodiments, the braided shield layer is configured to coaxially surround the inner conductive foil layer.

In embodiments, the sealed joint of the sealed outer conductive foil portion is configured to include a sealant, a first lateral region of the sealed outer conductive foil portion, and a second lateral region of the sealed outer conductive foil portion wherein the sealant is disposed between the first and second lateral regions of the sealed outer conductive foil portion.

In embodiments, the inner conductor portion comprises a center conductor that extends along a longitudinal axis of the coaxial cable.

BRIEF DESCRIPTION OF THE DRAWINGS

Further advantages and features of the present disclosure will become apparent from the following description and the accompanying drawings, to which reference is made.

DETAILED DESCRIPTION

Reference will now be made in detail to presently preferred embodiments and methods of the present disclosure, which constitute the best modes of practicing the present disclosure presently known to the inventors. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

A conventional coaxial cable has a center conductor, a dielectric insulator with a single aluminum foil cover, one braided shield layer surrounding the foil covered dielectric insulator, and a plastic insulating jacket covering the braided shield. Additionally, “tri-shield” and “quad-shield” versions of conventional coaxial cable are being increasingly used due to their improved performance.

Figure 1:
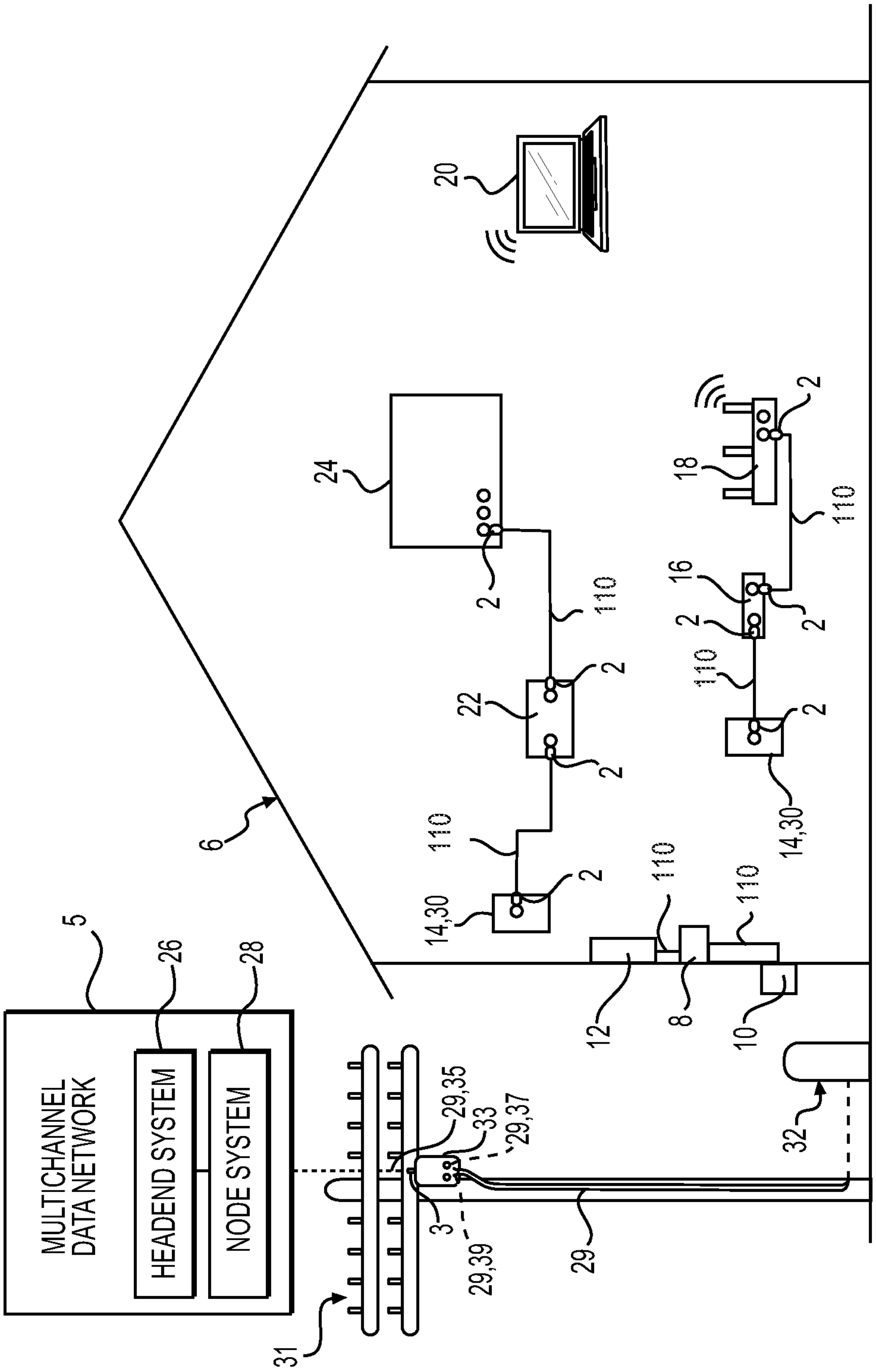
FIG. 1 is a schematic view of an exemplary network environment in accordance with various aspects of the disclosure.

Referring to FIG. 1, cable connectors 2 and 3 enable the exchange of data signals between a broadband network or multichannel data network 5, and various devices within a home, building, venue or other environment 6. For example, the environment's devices can include: (a) a point of entry (“PoE”) filter 8 operatively coupled to an outdoor cable junction device 10; (b) one or more signal splitters within a service panel 12 which distributes the data service to interface ports 14 of various rooms or parts of the environment 6; (c) a modem 16 which modulates radio frequency (“RF”) signals to generate digital signals to operate a wireless router 18; (d) an Internet accessible device, such as a mobile phone or computer 20, wirelessly coupled to the wireless router 18; and (e) a set-top unit 22 coupled to a television (“TV”) 24. In one embodiment, the set-top unit 22, typically supplied by the data provider (e.g., the cable TV company), includes a TV tuner and a digital adapter for High Definition TV.

In one distribution method, the data service provider operates a headend facility or headend system 26 coupled to a plurality of optical node facilities or node systems, such as node system 28. The data service provider operates the node systems as well as the headend system 26. The headend system 26 multiplexes the TV channels, producing light beam pulses which travel through optical fiber trunklines. The optical fiber trunklines extend to optical node facilities in local communities, such as node system 28. The node system 28 translates the light pulse signals to RF electrical signals.

In one embodiment, a drop line coaxial cable (coaxial drop cable) or weather-protected or weatherized coaxial cable 110 is connected to the headend facility 26 or node facility 28 of the service provider. In the example shown, the weatherized coaxial cable 110 is routed to a standing structure, such as utility pole 31.

A splitter or entry junction device 33 is mounted to, or hung from, the utility pole 31. In the illustrated example, the entry junction device 33 includes an input data port or input tap for receiving a hardline connector or pin-type connector 3. The entry junction box device 33 also includes a plurality of output data ports within its weatherized housing. It should be appreciated that such a junction device can include any suitable number of input data ports and output data ports.

The end of the weatherized coaxial cable 35 is attached to a hardline connector or pin-type connector 3, which has a protruding pin insertable into a female interface data port of the junction device 33. The ends of the weatherized coaxial cables 37 and 39 are each attached to one of the connectors 2 described below. In this way, the connectors 2 and 3 electrically couple the cables 35, 37 and 39 to the junction device 33.

In one embodiment, the pin-type connector 3 has a male shape which is insertable into the applicable female input tap or female input data port of the junction device 33. The two female output ports of the junction device 33 are female-shaped in that they define a central hole configured to receive, and connect to, the inner conductors of the connectors 2.

In one embodiment, each input tap or input data port of the entry junction device 33 has an internally threaded wall configured to be threadably engaged with one of the pin-type connectors 3. The network 5 is operable to distribute signals through the weatherized coaxial cable 35 to the junction device 33, and then through the pin-type connector 3. The junction device 33 splits the signals to the pin-type connectors 2, weatherized by an entry box enclosure, to transmit the signals through the cables 37 and 39, down to the distribution box 32 described below.

In another distribution method, the data service provider operates a series of satellites. The service provider installs an outdoor antenna or satellite dish at the environment 6. The data service provider connects a coaxial cable to the satellite dish. The coaxial cable distributes the RF signals or channels of data into the environment 6.

In one embodiment, the multichannel data network 5 includes a telecommunications, cable/satellite TV (“CATV”) network operable to process and distribute different RF signals or channels of signals for a variety of services, including, but not limited to, TV, Internet and voice communication by phone. For TV service, each unique radio frequency or channel is associated with a different TV channel. The set-top unit 22 converts the radio frequencies to a digital format for delivery to the TV. Through the data network 5, the service provider can distribute a variety of types of data, including, but not limited to, TV programs including on-demand videos, Internet service including wireless or WiFi Internet service, voice data distributed through digital phone service or Voice Over Internet Protocol (VoIP) phone service, Internet Protocol TV (“IPTV”) data streams, multimedia content, audio data, music, radio and other types of data.

In one embodiment, the multichannel data network 5 is operatively coupled to a multimedia home entertainment network serving the environment 6. In one example, such multimedia home entertainment network is the Multimedia over Coax Alliance ("MoCA") network. The MoCA network increases the freedom of access to the data network 5 at various rooms and locations within the environment 6. The MoCA network, in one embodiment, operates on cables 110 within the environment 6 at frequencies in the range 1125 MHz to 1675 MHz. MoCA compatible devices can form a private network inside the environment 6.

In one embodiment, the MoCA network includes a plurality of network-connected devices, including, but not limited to: (a) passive devices, such as the PoE filter 8, internal filters, diplexers, traps, line conditioners and signal splitters; and (b) active devices, such as amplifiers. The PoE filter 8 provides security against the unauthorized leakage of a user's signal or network service to an unauthorized party or non-serviced environment. Other devices, such as line conditioners, are operable to adjust the incoming signals for better quality of service. For example, if the signal levels sent to the set-top box 22 do not meet designated flatness requirements, a line conditioner can adjust the signal level to meet such requirement.

In one embodiment, the modem 16 includes a monitoring module. The monitoring module continuously or periodically monitors the signals within the MoCA network. Based on this monitoring, the modem 16 can report data or information back to the headend system 26. Depending upon the embodiment, the reported information can relate to network problems, device problems, service usage or other events.

At different points in the network 5, cables 110 can be located indoors, outdoors, underground, within conduits, above ground mounted to poles, on the sides of buildings and within enclosures of various types and configurations. Cables 110 can also be mounted to, or installed within, mobile environments, such as land, air and sea vehicles.

As described above, the data service provider uses coaxial cables 110 (FIGS. 1, 3A-3E) to distribute the data to the environment 6 (FIG. 1). The environment 6 has an array of coaxial cables 110 at different locations. The connectors 2 are attachable to the coaxial cables 110. The cables 110, through use of the connectors 2, are connectable to various communication interfaces within the environment 6, such as the female interface ports 14 illustrated in FIGS. 1-2. In the examples shown, female interface ports 14 are incorporated into: (a) a signal splitter within an outdoor cable service or distribution box 32 which distributes data service to multiple homes or environments 6 close to each other; (b) a signal splitter within the outdoor cable junction box or cable junction device 10 which distributes the data service into the environment 6; (c) the set-top unit 22; (d) the TV 24; (e) wall-mounted jacks, such as a wall plate; and (f) the router 18.

Figure 2:
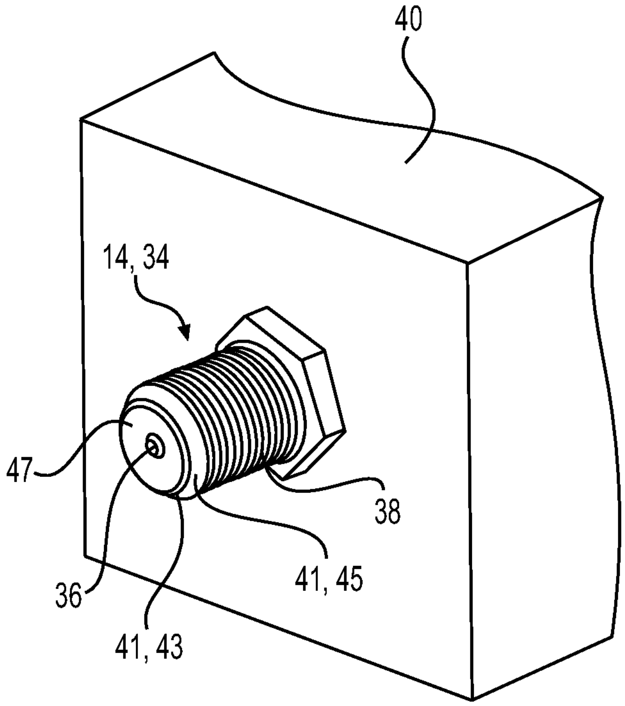
FIG. 2 is a perspective view of an exemplary interface port in accordance with various aspects of the disclosure.

In one embodiment, each of the female interface ports 14 includes a stud or jack, such as the cylindrical stud 34 illustrated in FIG. 2. The stud 34 has: (a) an inner, cylindrical wall 36 defining a central hole configured to receive an electrical contact, wire, pin, conductor (not shown) positioned within the central hole; (b) a conductive, threaded outer surface 38; (c) a conical conductive region 41 having conductive contact sections 43 and 45; and (d) a dielectric or insulation material 47.

In some embodiments, stud 34 is shaped and sized to be compatible with the F-type coaxial connection standard. It should be understood that, depending upon the embodiment, stud 34 could have a smooth outer surface. The stud 34 can be operatively coupled to, or incorporated into, a device 40 which can include, for example, a cable splitter of a distribution box 32, outdoor cable junction box 10 or service panel 12; a set-top unit 22; a TV 24; a wall plate; a modem 16; a router 18; or the junction device 33.

During installation, the installer couples a cable 110 to an interface port 14 by screwing or pushing the connector 2 onto the female interface port 34. Once installed, the connector 2 receives the female interface port 34. The connector 2 establishes an electrical connection between the cable 110 and the electrical contact of the female interface port 34. The connector 2, shown in FIGS. 1 and 4, electrically grounds the braided shield layer 118 of the coaxial cable 110. The outer jacket 122 has a protective characteristic, guarding the cable's internal components from damage. The outer jacket 122 also has an electrical insulation characteristic.

Figure 3A:
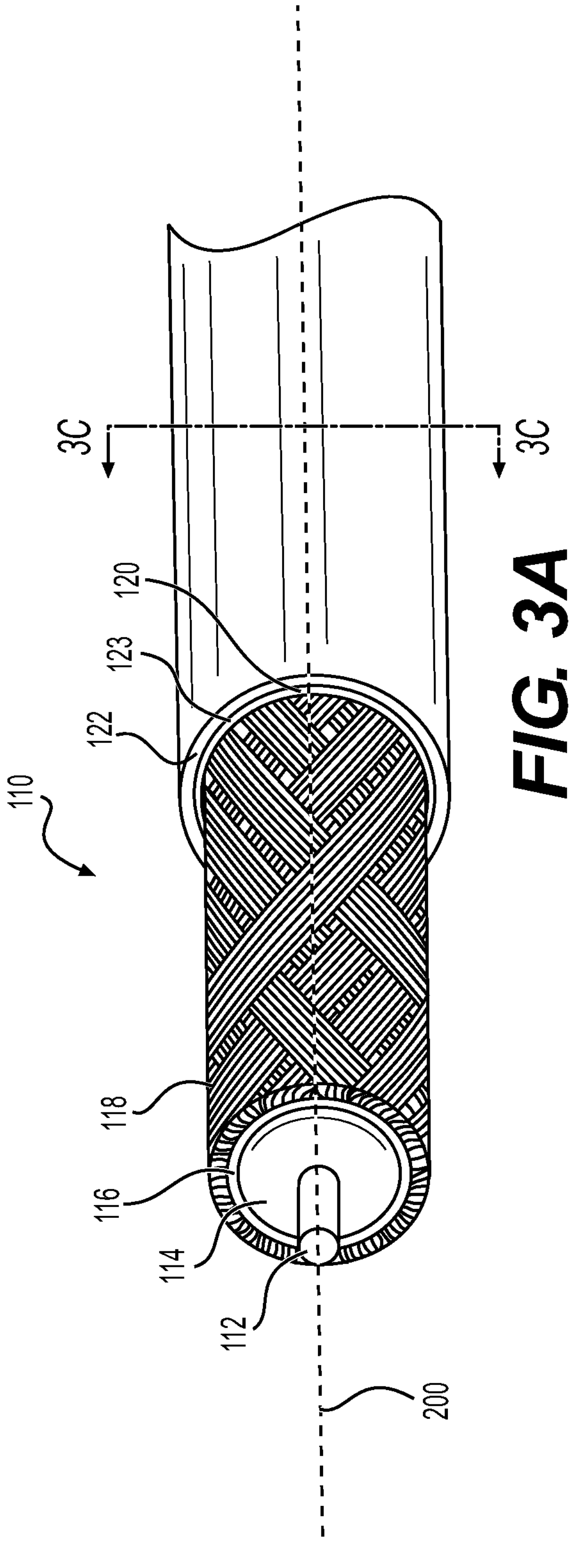
FIG. 3A shows an example tri-shield coaxial cable according to the present disclosure.
Figure 3B:
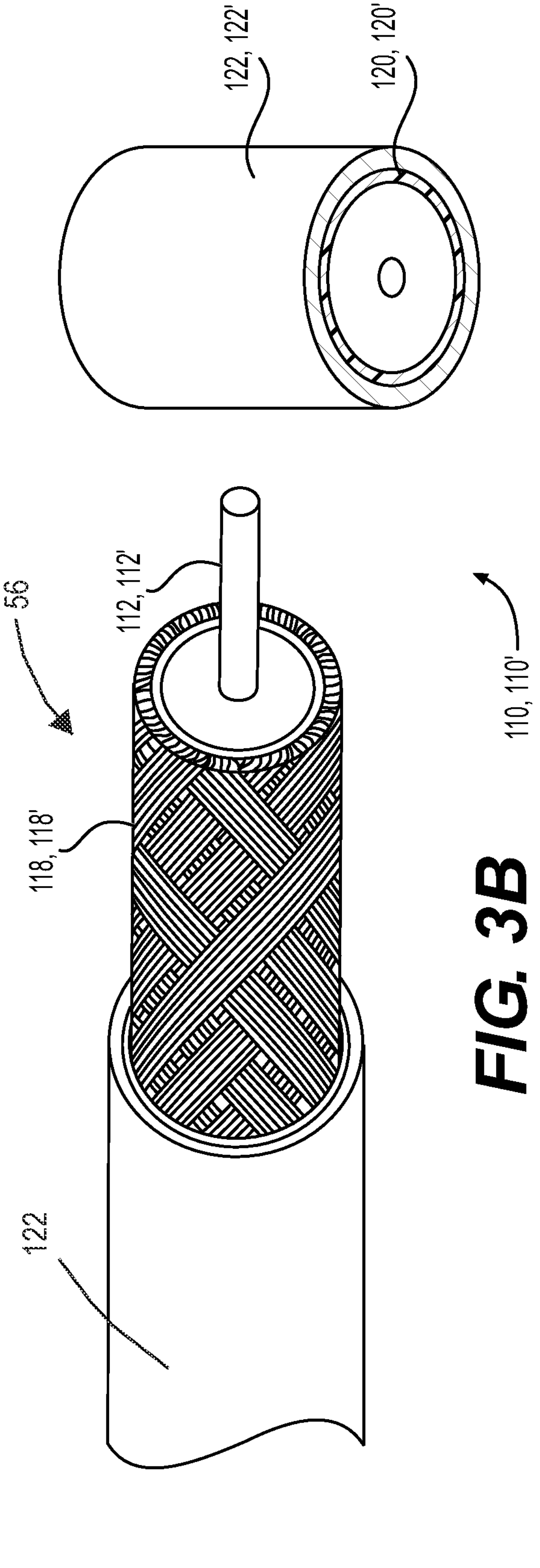
FIG. 3B shows the cable of FIG. 3A with the portion of the outer jacket removed wherein the removed outer jacket includes the bonded layer of foil.
Figure 3D:
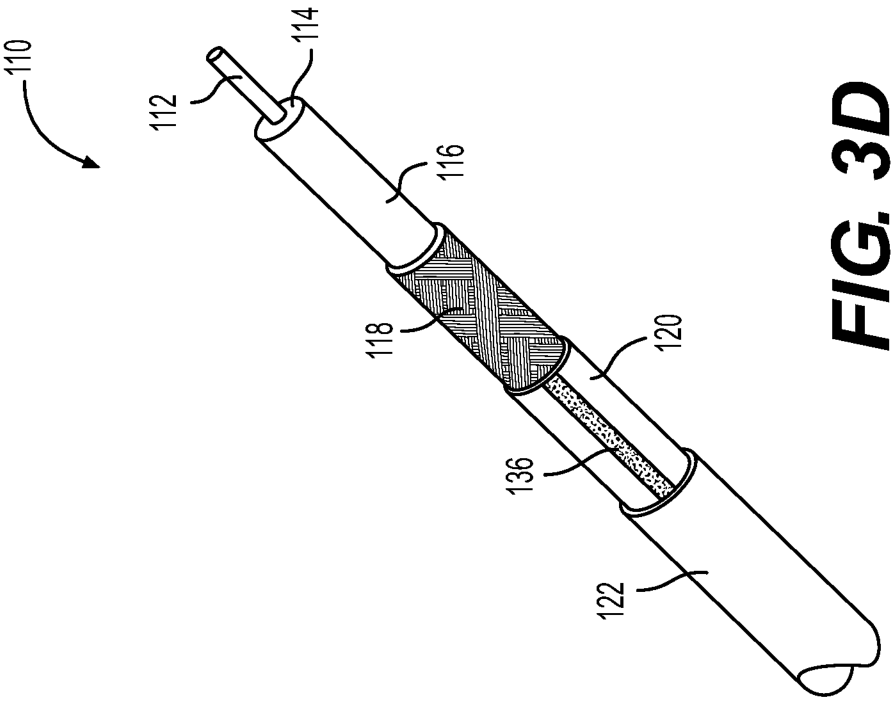
FIG. 3D is a cut-away view of the tri-shield coaxial illustrating the various layers along with the optional floodant.

Referring to FIG. 3A, in one embodiment, an installer or preparer prepares a terminal end 56 of the cable 110 so that it can be mechanically connected to the connector 2 (see FIG. 1). To do so, the preparer removes or strips away portions of the outer jacket 122, outer conductive foil layer 120, braided shield layer 118, inner foil layer 116, and dielectric insulator 114 so as to expose the side walls of the outer jacket 122, outer conductive foil layer 120, braided shield layer 118, foil layer 48 and insulator 114 in a stepped or staggered fashion as shown in FIG. 3D. In the examples shown in FIGS. 3A and 3B, the prepared end 56 has a two step-shaped configuration. In FIG. 3D, the prepared end 56 has a four step-shaped configuration, where: (1) the center conductor 112 extends beyond the end of the insulator 114 and inner foil layer 116; (2) the insulator 114 and inner foil layer 116 both extend beyond an end of braided shield layer 118; and (3) the braided shield layer 118 extends beyond an end of the outer conductive foil layer 120; and (4) the outer conductive foil layer 120 extends beyond the outer jacket 122. At this point, the cable 110 is ready to be connected to the connector 2.

Depending upon the embodiment, the components of the cable 110 can be constructed of various materials which have some degree of elasticity or flexibility. The elasticity enables the cable 110 to flex or bend in accordance with broadband communications standards, installation methods or installation equipment. Also, the radial thicknesses of the cable 110, outer jacket 122, outer conductive foil layer 120, braided shield layer 118, inner foil layer 116 can vary based upon parameters corresponding to broadband communication standards or installation equipment.

Figure 4:
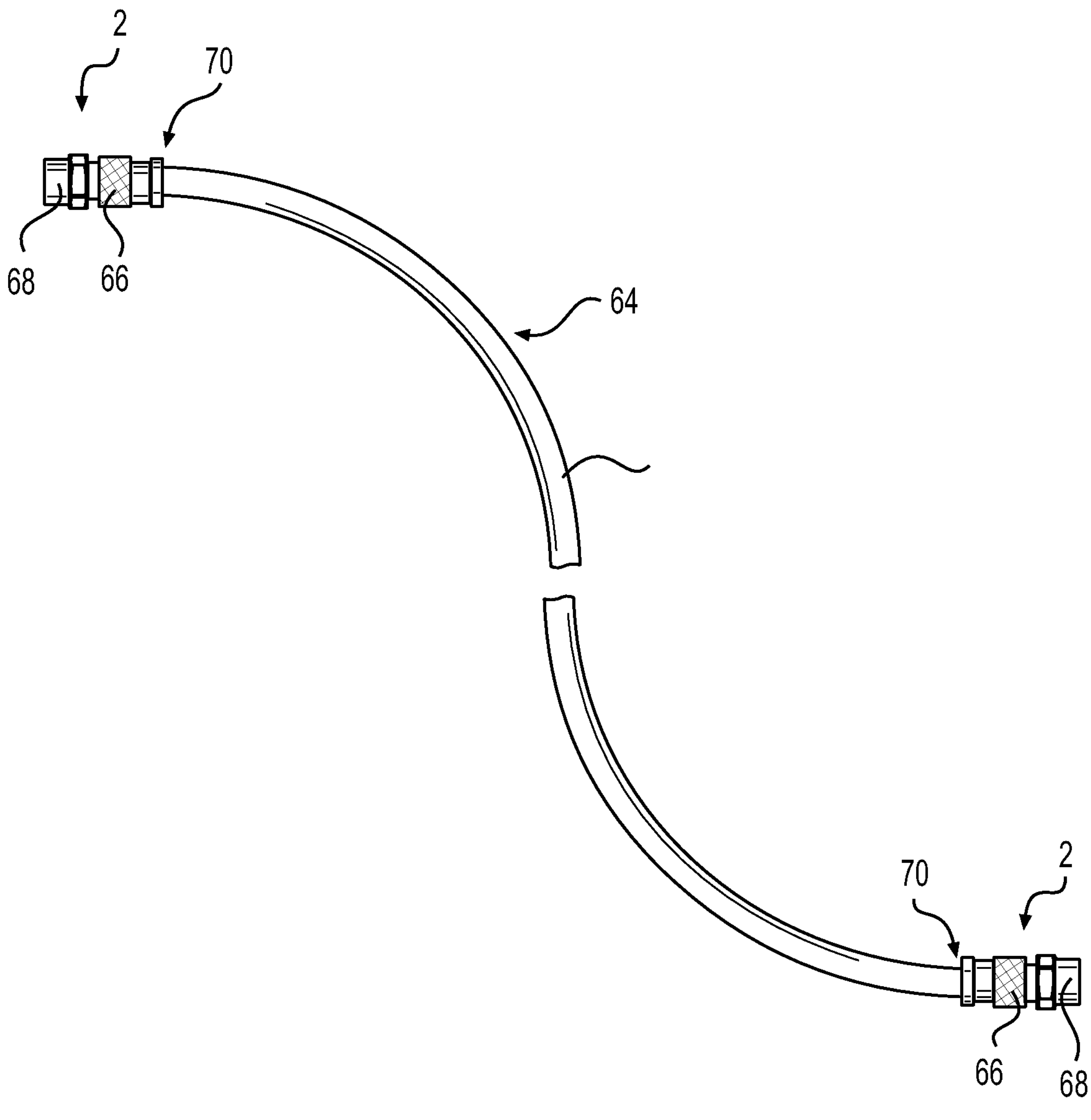
FIG. 4 is a top view of one embodiment of a coaxial cable jumper or cable assembly configured to be operatively coupled to the multichannel data network.
Figure 5A:
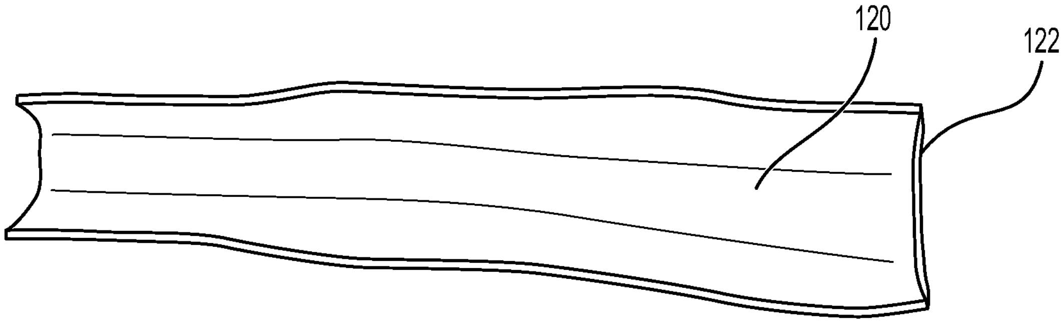
FIG. 5A shows a portion of the bonded outer foil layer bonded to the corresponding inner surface portion of the outer jacket.
Figure 5B:
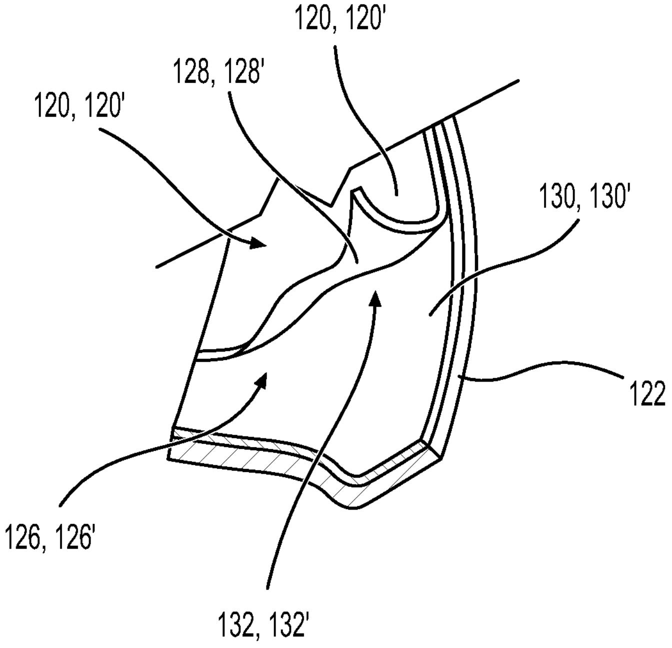
FIG. 5B shows the seam defined by the outer foil layer (without the sealant).

With reference to FIG. 4, a cable jumper or cable assembly 64 includes a combination of the connector 2 and the cable 110 attached to the connector 2. In this embodiment, the connector 2 includes a connector body or connector housing 66 and a fastener or coupler 68, such as a threaded nut, which is rotatably coupled to the connector housing 66. The cable assembly 64 has, in one embodiment, connectors 2 on both of its ends 70. In some embodiments, the cable assembly 64 may have a connector 2 on one end and either no connector or a different connector at the other end. Preassembled cable jumpers or cable assemblies 64 can facilitate the installation of cables 110 for various purposes. The cable connector 2 may provide a reliable electrical ground, a secure axial connection, and a watertight seal across leakage-prone interfaces of the coaxial cable connector. The cable connector 2 may include an outer conductor (or braided layer) engager or post, a housing or body, and a coupler or threaded nut to engage an interface port. The outer conductor (or braided layer) engager of the connector 2 may includes an aperture (not shown) for receiving the outer braided conductor of a prepared coaxial cable, i.e., an end which has been stripped of its outer jacket similar to that shown in FIGS. 3A, 3B, 3D, and a plurality of resilient fingers projecting axially away from the interface port. The body (not shown) of the connector 2 receives and engages resilient fingers (not shown) of the outer conductor (or braided layer) engager to align the body with the outer conductor (or braided layer) engager in a pre-installed state.

According to the disclosure, the aforementioned connectors 2 may be configured as coaxial cable connector 2. When the connector 2 is installed on an interface port 14 (see FIGS. 1-2), a forward end or portion is proximal to, or toward, the interface port 14, and a rearward end or portion is distal, or away, from the interface port 14.

Referring back to FIGS. 3A-3C, an exemplary coaxial tri-shield drop cable 110 according to the present disclosure is illustrated. As shown, the tri-shield drop cable 110 includes a center conductor 112, a dielectric insulator 114, an inner conductive foil layer 116, braided shield layer 118 surrounding the inner conductive foil layer 116, an outer conductive foil layer 120, which may be bonded to an outer plastic insulating jacket 122 wherein the outer conductive foil layer is also sealed using a sealant to prevent external moisture from passing through the outer conductive foil layer towards the braided shield layer 118.

The center conductor 102 may be a 18AWG Copper Conductor. The dielectric insulator 14 may be a PVC Dielectric. As shown in FIGS. 3A-3E, the dielectric insulator 114 coaxially surrounds the center conductor 112. An inner conductive foil layer 116 coaxially surrounds the dielectric insulator 114. A braided shield layer 118 coaxially surrounds the inner conductive foil layer 116. An outer conductive foil layer 120 coaxially surrounds the braided shield layer 118. As later described herein, the outer conductive foil layer 120 may be sealed against external moisture by using a sealant 136 in an overlapping region 127 (FIG. 6B) such that the outer conductive foil layer 120 is configured to prevent external moisture from passing the outer conductive foil layer towards the braided shield layer 118 and the other internal components of the coaxial cable 110*m* such as the center conductor 112, the dielectric insulator 114, the inner conductive foil layer 116. It is understood that the center conductor 112, the dielectric insulator 114, the inner conductive foil layer 116, the braided shield layer 118, the outer conductive foil layer 120, and the outer jacket 122 are elongated members that extend along the length of the coaxial cable 110.

The outer jacket 122 coaxially surrounds the outer conductive foil layer 120 that has been sealed using the sealant 136 as further described herein. The outer jacket 122 generally includes a protective characteristic, guarding the cable's internal components from damage. The outer jacket 122 may also has an electrical insulation characteristic. The outer jacket 122 may constructed of a suitable, flexible material such as polyvinyl chloride (PVC) or rubber. The outer jacket 122 may optionally have a lead-free formulation including black-colored PVC and a sunlight resistant additive or sunlight resistant chemical structure. However, the outer jacket 122 may be scratched or punctured due to environmental debris, animals, or other external forces thereby creating an undesirable opening (not shown) in the outer jacket 122. As a result of such an undesirable opening at the outer jacket 122, external moisture from the environment may pass through the opening created in the outer jacket 122.

Known coaxial cables of the prior art are configured such that the external moisture could cause undesirable corrosion to the internal components of the coaxial cable 110, such as the center conductor 112, the dielectric insulator 114, the inner conductive foil layer 116, the braided shield layer 118. However, the coaxial cable of the present disclosure provides a sealed outer conductive foil layer 120 as described herein.

Figure 6A:
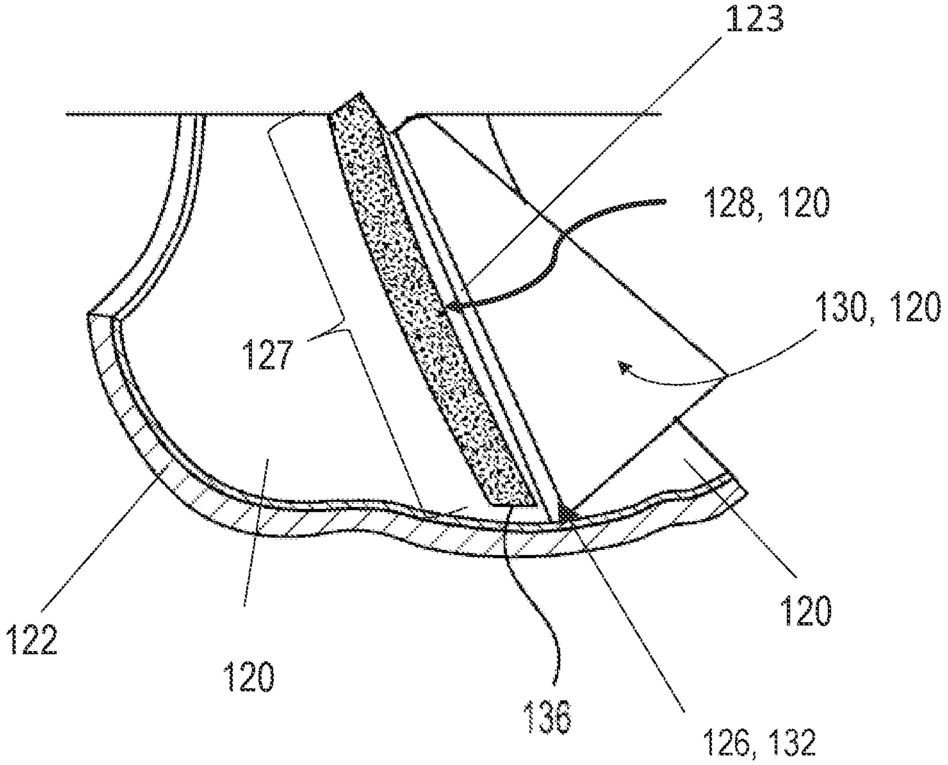
FIG. 6A illustrates the sealant used to join the first lateral region and the second lateral region in the outer foil layer according to the various embodiments of the present disclosure wherein the second lateral region of the outer foil layer is peeled back.
Figure 6B:
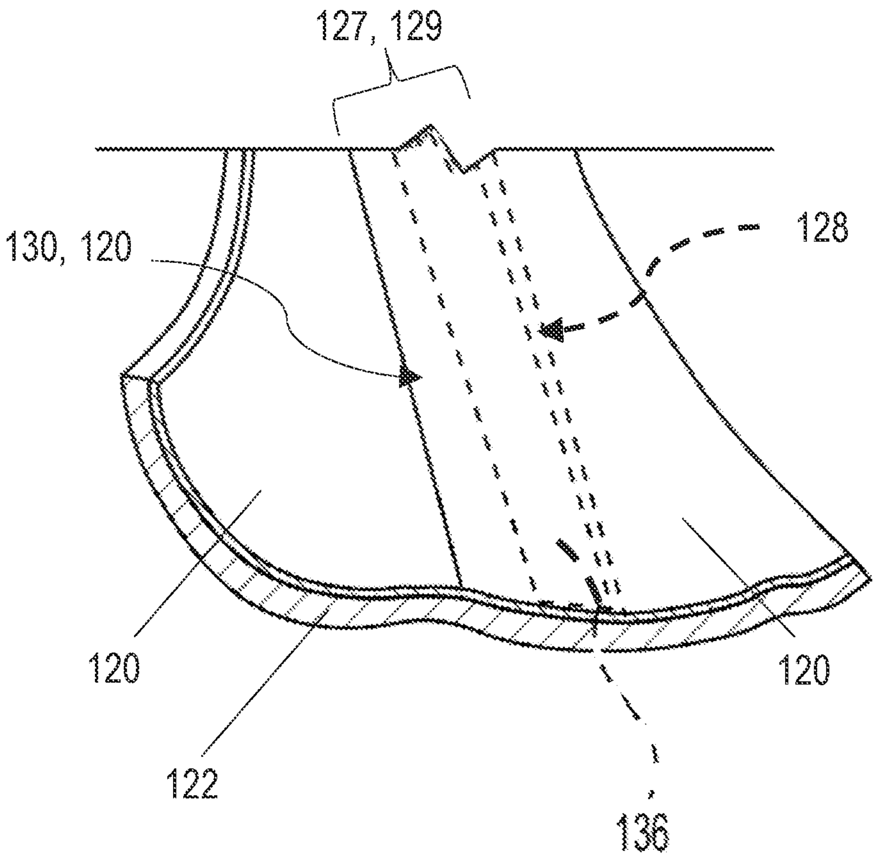
FIG. 6B illustrates the sealed joint having a first lateral region overlapping with the second lateral region wherein the sealant is disposed between the first lateral region and the second lateral region.

As previously noted, the outer conductive foil layer 120 may be bonded to the outer jacket 122 wherein the outer conductive foil layer 120 coaxially surrounds the braided shield layer 118. In order to prevent external moisture from passing the outer conductive foil layer 120 (towards the braided shield layer 118, inner conductive foil layer 116, the dielectric insulator 114 and the center conductor 112), the outer conductive foil layer 120 may be sealed using a sealant 136 that is provided along the length of first lateral region 128 as shown in FIG. 6A. As shown in FIGS. 6A-6B, the first lateral region 128 of the outer conductive foil layer 120 overlaps with a mating region 130 of the outer conductive foil layer 120 to define the overlapping region 127 (shown in FIG. 6B). Accordingly, the sealant 136 may be disposed between the first lateral region 128 of the outer conductive foil layer 120 and the mating region 130 in the overlapping region 127 (FIG. 6B) to provide a sealed joint 129 between the first lateral region 128 of the outer conductive foil layer 120 and a second lateral region 130 of the outer conductive foil layer 120. As shown in FIG. 6B, the sealed joint 129 (of the outer conductive foil layer) is disposed in the overlapping region 127. The sealed joint 129 includes the first lateral region 128, the second lateral region 130 and the sealant 136 disposed between the first lateral region 128 and the second lateral region 130.

Figure 9:
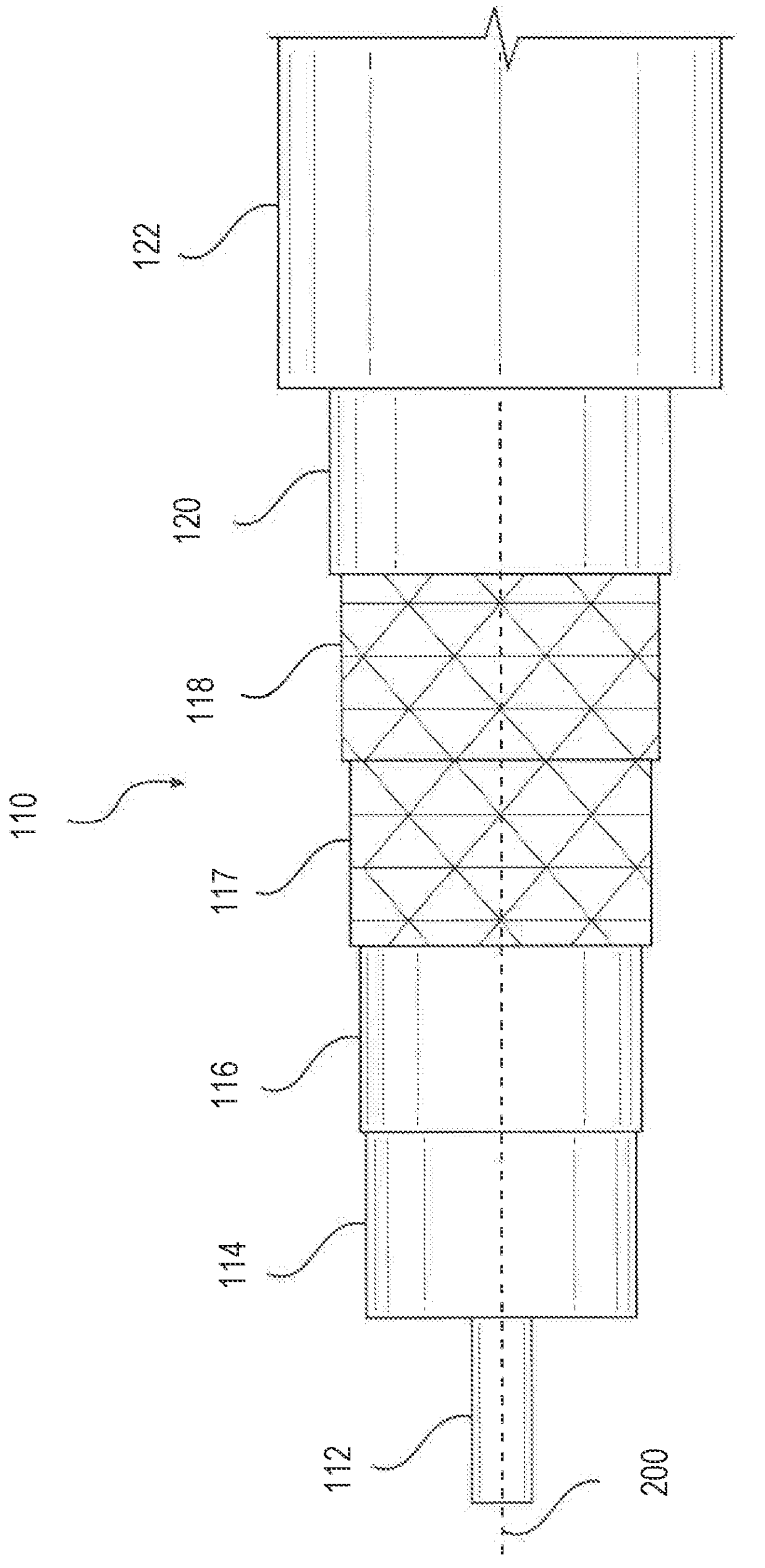
FIG. 9 is a side view of a quad shield cable having an inner braided layer and a braided layer.

With respect to the present disclosure, it is understood that a coaxial cable according to the present disclosure may further include an inner braided shield layer 117 may be disposed adjacent to the braided shield layer 118 wherein the braided shield layer surrounds the inner braided shield layer 117. (See FIG. 9). As shown, the inner braided shield layer 117 may be configured to coaxially surround the inner conductive foil portion 116. The additional shielding layer of the inner braided shield layer 117 may provide extra insulation between signals internal on the coax and over the air signals, thus allowing the cable to provide a stronger signal over a longer run, which can be important for high definition (HD) and ultra-high definition (UHD), or 4K, television. The foil layers/portins 116, 120 provide high frequency shielding, while the braided shield layer 118 (and the optional inner braided shield layer 117) provide low frequency shielding and adds strength to the cable.

While the outer conductive foil layer 120 may be bonded to the outer jacket as shown in FIG. 2, it is also understood that the outer conductive foil layer 120 may alternatively be disposed between the braided shield layer 118 and the outer jacket 122 wherein the outer conductive foil layer 120 is not bonded to the outer jacket 122. When the outer conductive foil layer 120 is not bonded to the outer jacket, floodant 755 may optionally be implemented as well—as further described herein. Regardless of whether the outer conductive foil layer 120 is bonded to the outer jacket 122, it is understood that the outer conductive foil layer 120 defines a longitudinal seam 126 as shown in FIG. 6. Referring to FIG. 6A, where the outer conductive foil layer 120 is bonded to the outer jacket 122, the longitudinal seam 126 is defined in the region where a first lateral region 128 of the outer conductive foil layer 120 meets with a second lateral region 130 or mating region 130 of the outer conductive foil layer 120 as shown. Due to the nature of use of this type of coaxial cable 110 (such as outdoor aerial application where one end of the drop cable 110 is attached to a telephone pole while the other end is attached to a customer's building or an underground cable that is exposed to environmental moisture), moisture from the external environment (rain, water, humidity, etc.) may seep through the longitudinal seam 126 and towards the braided layer 118, the dielectric insulator 114, and/or the center conductor 112 as previously indicated, thereby negatively affecting the performance of the cable 110. These negative effects can result from electrical shorting of conductor paths in the coaxial cable 110 and/or from corrosion of the internal components of the coaxial cable 110, such as, for example, the braided layer 118, inner foil layer, and/or the center conductor 112.

Absent the sealant 136 and the sealed joint 129 in the outer conductive foil layer 120 (shown in FIGS. 6A-6B), the moisture from the external environment (rain, water, humidity, etc.) may seep through the longitudinal seam 126 and towards the braided layer 118, the dielectric insulator 114, and/or the center conductor 112. Also, absent the sealant 136 and the sealed joint 129 in the outer conductive foil layer 120 (shown in FIGS. 6A-6B), the longitudinal seam 126 (shown in FIG. 8A) may create a longitudinal pathway 132 for moisture to also travel down the length of the cable 110 and seep past the outer conductive foil layer 120 (towards the braided layer 118 and other internal components of the cable 110). Therefore, the present disclosure provides for a sealed outer conductive foil layer 120 wherein a sealant 136 is provided to join the first lateral region 128 of the outer conductive foil layer 120 to the second lateral region 130 of the outer conductive foil layer 120 as shown in FIG. 6B.

The foregoing arrangement, therefore, prevents moisture from the external environment from seeping through the outer conductive foil layer 120 and into contact with the braided layer 118, inner foil layer 116, dielectric insulator 114, and/or center conductor 112. It is understood that the sealant 136 may be formed from a polymeric material or the like, and is configured to adhere the first lateral region 128 of the outer conductive foil layer 120 to the second lateral region 130 of the outer conductive foil layer 120 thereby forming the sealed joint 129 so as to block any moisture from seeping past the outer conductive foil layer 120 towards the braided layer 118, inner foil layer 116, dielectric insulator 114 and/or center conductor 112.

Figure 7:
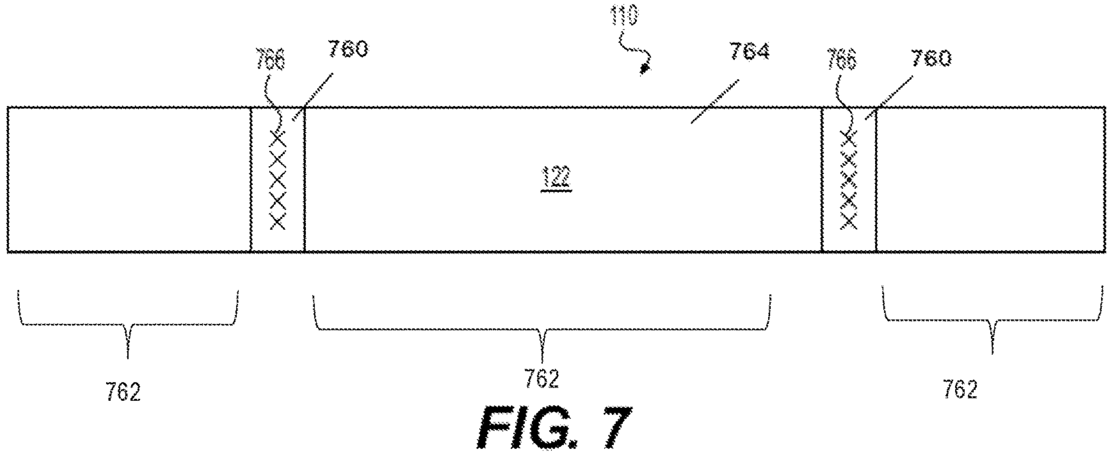
FIG. 7 is a side view of the drop cable of FIG. 3A.
Figure 8:
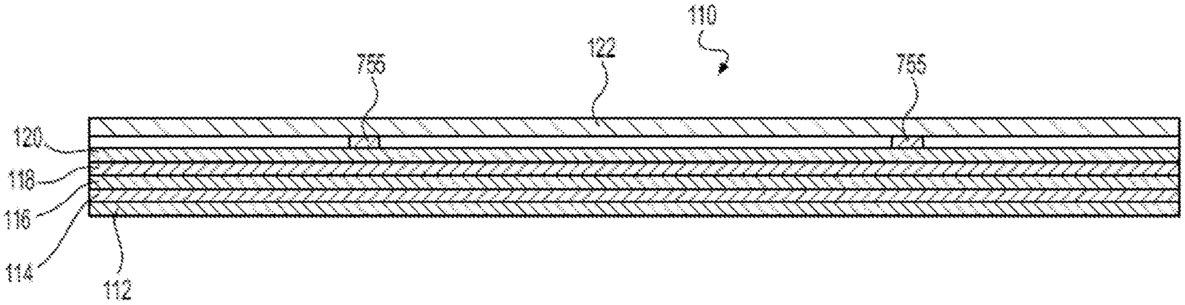
FIG. 8 is a side partial/top cross-sectional view of the drop cable of FIG. 3A.

Referring now to FIGS. 7, and 8, the tri-shield coaxial drop cable 110 may also optionally include a non-flowing floodant 755 between the second elongated, conductive foil layer 120 and the interior surface 123 (see FIG. 3A) of the outer jacket 122 at a plurality of floodant areas 760 along a length of the cable 110 so as to circumferentially seal the space between the outer conductive foil layer 120 and the interior surface 123 of the outer jacket 122 at the plurality of floodant areas 760. According to various aspects of the disclosure, the non-flowing floodant 755 may be a non-flowing, Amorphous Polypropylene flooding compound such as Amorphous Polypropylene Drop (APD).

As shown in FIGS. 7 and 8, the optional non-flowing floodant 755 may be applied in a segmented manner such that the coaxial drop cable 110 includes areas 760 along its length that include the applied floodant 755 and areas 762 (FIG. 7) along its length that do not include floodant. If the outer jacket 122 develops an opening caused by rodent chew, abrasions, or other methods or causes, moisture can enter into the coaxial drop cable 110. However, the areas 760 that include the applied floodant 755 will limit the flowing or wicking of water to the area 762 without floodant between two consecutive areas 760 that include the applied floodant 755. Thus, the flowing or wicking of water to the connectors/equipment at ends of the cable is prevented by the floodant 755 at the two consecutive areas 760 that include the applied floodant 755, thereby preventing damage due to corrosion and/or shorting out of the coaxial circuit. On the other hand, the areas 762 that do not include the floodant 755 provide regions of the coaxial drop cable 110 where an installer can prepare and/or terminate the coaxial drop cable 110 for connection without the mess normally associated with the use of a cable having floodant along substantially its entire length.

As shown in FIG. 7, the outer surface 764 of the outer jacket 122 may include markings 766 that identify locations along the length of the coaxial drop cable 110 wherein the floodant 755 (FIG. 8) is located. For example, the markings 766 may include circumferential bands or stripes, longitudinal dashes, letters, numbers, shapes, X's, or any other markings that are aligned with the areas 760 that include the applied floodant 755. The markings 766 allow an installer to visually see where the coaxial drop cable is clear of floodant to allow for clean preparation and connectorization without a messy residue of floodant. Alternatively, an outer jacket of the coaxial cable (not shown) may have markings that are aligned with the areas that do not include the floodant (not shown), while the areas with the floodant are unmarked.

Figure 3C:
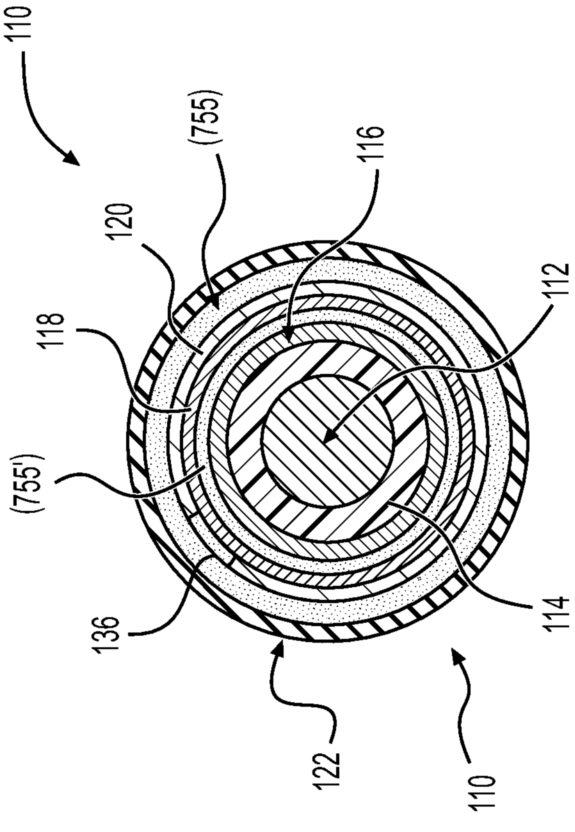
FIG. 3C shows a cross-sectional view of the tri-shield coaxial cable along lines 3B-3B in FIG. 3A where the outer foil layer is not bonded to the outer jacket.
Figure 3E:
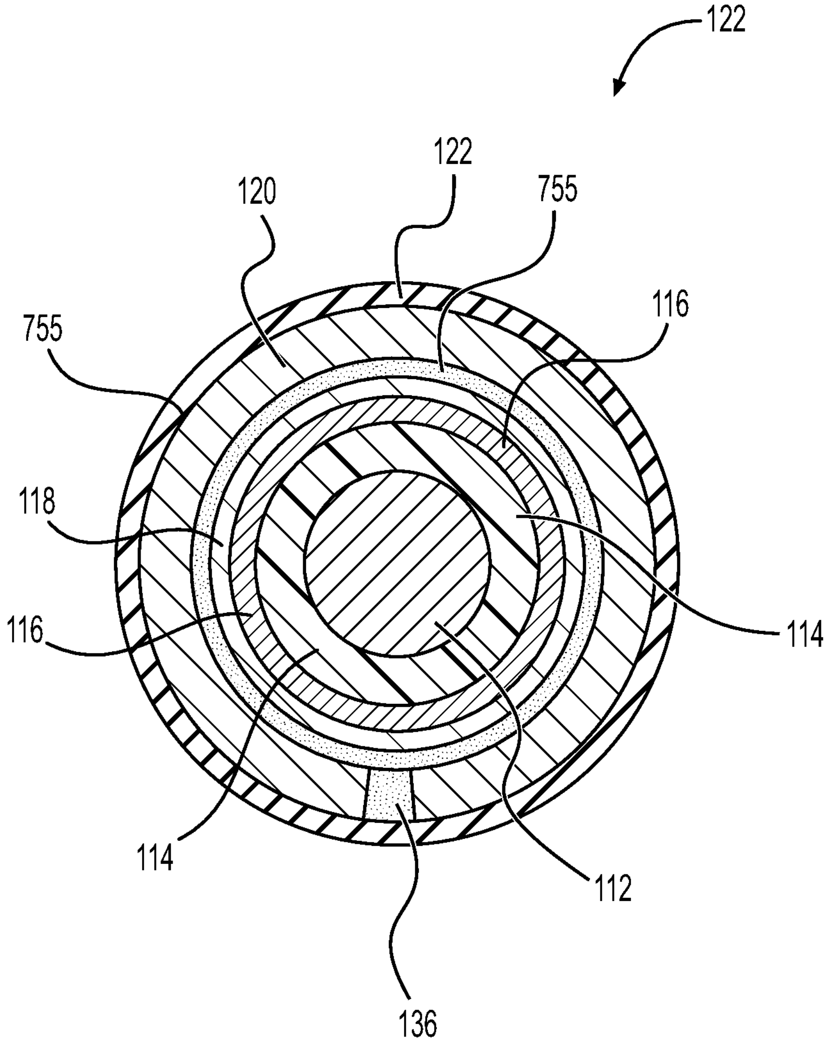
FIG. 3E is a cross-sectional view of the tri-shield coaxial cable along lines 3B-3B in FIG. 3A where the outer foil layer is bonded to the outer jacket.

Referring now to FIG. 3C, the coaxial cable 110 may alternatively or additionally include a non-flowing floodant 755' between the outer conductive foil layer 120 and the elongated outer conductor (or braided layer) (or braided shield) 118. Of course, the floodant 755' can penetrate the openings of the screen, mesh, or braid structure of the braided layer 118 so as to circumferentially seal the space between the inner conductive foil layer 116 and the outer conductive foil layer 120. The non-flowing floodants 755, 755' may be the same or different non-flowing, Amorphous Polypropylene flooding compounds.

It should be appreciated that, the present disclosure is directed to any type of coaxial cable, such as but not limited to a tri-shield coaxial cable 110 and/or a quad-shield coaxial cable 110 (See FIG. 9) and other coaxial cables. In other embodiments, the cable 110 may instead be an underground coaxial cable or any other cable or wiring. For example, persons of ordinary skill in the art would understand that sooner or later all underground conduit or cable fills with water, even direct burial grade cable. Thus, it may be desirable to provide underground coaxial cable with a sealed outer conductive foil layer 120 and optionally having a non-flowing floodant 755 applied in a segmented manner such that the underground coaxial cable 110 includes areas along its length that include the applied floodant 755 and areas along its length that do not include floodant. Similarly, any other cable or wiring that includes a jacket that may develop an opening due rodent chew, abrasions, or other methods or causes may be provided with a sealed outer conductive foil layer 118 (having a sealed joint 129 as described above and as shown in FIG. 6B). As indicated, the coaxial cable 110 according to the various embodiments of the present disclosure may, but not necessarily further include, a non-flowing floodant 755 applied in a segmented manner as previously described.

In the various embodiments of the present disclosure, it is understood that the inner conductor 112 or center conductor 112 is operable to carry data signals to and from a data network. Depending upon the embodiment, the inner conductor 112 can be a strand, a solid wire, or a hollow, tubular wire. As previously noted, the inner conductor 112 may be a conductive material suitable for data transmission, such as a metal or alloy including copper, including, but not limited, to copper-clad aluminum ("CCA"), copper-clad steel ("CCS") or silver-coated copper-clad steel ("SCCCS").

Also, in the various embodiments of the present disclosure, the elongated dielectric insulator 114, may have a tubular shape. The elongated dielectric insulator 114 may be radially flexible, and the elongated dielectric insulator 114 may also be axially flexible along the longitudinal axis 200 (see FIG. 3A). Depending upon the embodiment, the elongated dielectric insulator 114 can be a suitable polymer, such as polyethylene ("PE") or a fluoropolymer, in solid or foam form.

Also, in the various embodiments of the present disclosure, the braided layer 118 and/or the inner braided layer 117 (117 shown in FIG. 9) may each include a conductive RF shield or electromagnetic radiation shield. For example, each the braided layer 118 may include a conductive screen, mesh, or braid or otherwise has a perforated configuration defining a matrix, grid or array of openings. In one such embodiment, the braided layer 118 may have an aluminum material or a suitable combination of aluminum and polyester. When the inner conductor 112 and external electronic devices generate magnetic fields, the braided layer 118, which are grounded by a connector (not shown), cancels all, substantially all, or a suitable amount of the potentially interfering magnetic fields. Therefore, there may be less, or an insignificant, disruption of the data signals running through inner conductor 112. Also, there may be less, or an insignificant, disruption of the operation of external electronic devices near the cable 110.

With respect to the present disclosure, it is also understood that the inner and outer conductive foil layers 116, 120 may be tubular conductors that provide additional shielding of the magnetic fields. The inner and outer conductive foil layers 116, 120 may be a flexible foil tape or laminate. The inner conductive foil layer 116 may be flexible foil tape or laminate adhered to the elongated dielectric insulator 114, thus assuming the tubular shape of the insulator 204. As noted, the outer conductive foil layer 120 of the present disclosure contemplates that the foil layer 120 may optionally be bonded to the inner surface 123 of the outer jacket 122. The outer conductive foil layer 120 may include a flexible foil tape or laminate adhered to the inner surface 123 of the outer jacket 122, thus assuming the tubular shape of the outer jacket 122.

With respect to the present disclosure, the combination of the inner and outer conductive foil layers 116, 120 and the braided layer 118 (and the optional inner braided layer 117 in FIG. 9) can suitably block undesirable radiation or signal noise from leaving the cable 110. The moisture resistant feature of the sealed joint 129 in the outer conductive foil layer 118 of the coaxial cable 110 together with the arrangement of the aforementioned layers can result in an reduced disruption of data communications through the cable 110 as well as an additional decrease in interference with external devices, such as nearby cables and components of other operating electronic devices.

Also, with respect to the various embodiments of the present disclosure, the components of the cable 110 can be constructed of various materials which have some degree of elasticity or flexibility. The elasticity enables the cable 110 to flex or bend in accordance with broadband communications standards, installation methods or installation equipment. Also, the radial thicknesses of the cable 110, the inner conductor 112, the insulator 114, the inner and outer conductive foil layers 116, 120, the braided layer 118, and the jacket 122 can vary based upon parameters corresponding to broadband communication standards or installation equipment.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

What is claimed is:

1. A coaxial cable configured to provide enhanced protection from moisture leaks, comprising:
   - an inner conductor configured to extend along a longitudinal axis;
   - a dielectric insulator configured to coaxially surround the inner conductor;
   - an inner conductive foil layer configured to coaxially surround the dielectric insulator;
   - a braided shield layer configured to coaxially surround the inner conductive foil layer;
   - an outer conductive foil layer configured to coaxially surround the braided shield layer;
   - an outer jacket configured to coaxially surround the outer conductive foil layer;
   - a non-flowing floodant material disposed between the outer conductive foil layer and the outer jacket;
   - wherein the outer conductive foil layer is bonded to the outer jacket;
   - wherein the non-flowing floodant material is discontinuous along a length of the outer jacket;
   - wherein the outer conductive foil layer includes a first lateral region and a second lateral region;
   - wherein the first lateral region and the second lateral region are configured to overlap each other to form a circumferential mating region of the outer conductive foil layer, and wherein a radially outer surface of the first lateral region faces a radially inner surface of the second lateral region at the mating region;
   - wherein a sealant is disposed between the radially outer surface of the first lateral region and a radially inner surface of the second lateral region to form a sealed joint portion that is configured to extend longitudinally along an entire length of the outer conductive foil layer;

wherein the sealed joint portion includes first and second opposite circumferential end portions within the circumferential mating region;

wherein an outer surface portion of a non-overlapped portion of the outer conductive foil layer extending from the first lateral region to the second lateral region is free of the sealant; and wherein the outer conductive foil layer, the non-flowing floodant material, and the sealed joint portion are collectively configured to prevent moisture that enters the outer jacket from passing the outer conductive foil layer and migrating along the coaxial cable so as to prevent signal loss or damage to a connector that terminates the coaxial cable.

2. The coaxial cable of claim 1, wherein the inner conductor comprises a center conductor.

3. The coaxial cable of claim 1, wherein the non-flowing floodant material comprises amorphous polypropylene flooding compound.

4. The coaxial cable of claim 1, further comprising an outer braided shield layer configured to coaxially surround the braided shield layer.

5. The coaxial cable of claim 1, wherein the outer conductive foil layer is configured to coaxially surround the outer braided shield layer.

6. A coaxial cable configured to provide enhanced protection from moisture leaks, comprising:

a braided shield portion configured to encircle an inner conductive foil portion;

an outer jacket portion;

a sealed outer conductive foil portion bonded to the outer jacket and configured to encircle the braided shield portion;

wherein the outer jacket portion is configured to encircle the outer conductive foil portion;

wherein the outer conductive foil portion includes a first lateral portion and a second lateral portion;

wherein the first lateral portion and the second lateral portion are configured to overlap each other to form a circumferential mating portion of the outer conductive foil portion, and wherein a radially outer surface portion of the first lateral portion faces a radially inner surface portion of the second lateral portion at the mating portion;

wherein a sealant is disposed between the radially outer surface portion of the first lateral portion and a radially inner surface portion of the second lateral portion to form a sealed joint portion that is configured to extend longitudinally along a length of the outer conductive foil portion;

wherein the sealed joint portion includes first and second opposite circumferential end portions within the circumferential mating region; and wherein the outer conductive foil layer and the sealed joint portion are collectively configured to prevent moisture that enters the outer jacket from passing the outer conductive foil layer so as to prevent signal loss or damage to a connector that terminates the coaxial cable.

7. The coaxial cable of claim 6, wherein the sealed outer conductive foil portion further includes a first limiting region and a second limiting region each positioned between the outer conductive foil portion and the outer jacket portion to encircle the outer conductive foil portion; and wherein the first limiting region is separated from the second limiting region and each limiting region extends to less than the entire length of the outer jacket portion along a longitudinal axis of the outer jacket portion to prevent moisture that enters the outer jacket portion from migrating along the coaxial cable so as to prevent signal loss or damage to a connector that terminates the coaxial cable.

8. The coaxial cable of claim 6, wherein the sealant extends an entire length of the outer jacket portion.

9. The coaxial cable of claim 6, wherein the inner conductive foil portion comprises an inner conductive foil layer configured to coaxially surround an insulator portion.

10. The coaxial cable of claim 9, wherein the insulator portion is configured to surround an inner conductor portion.

11. The coaxial cable of claim 10, wherein the inner conductor portion comprises a center conductor that extends along a longitudinal axis of the coaxial cable.

12. The coaxial cable of claim 6, further comprising an inner braided shield portion configured to coaxially surround the inner conductive foil portion.

13. The coaxial cable of claim 12, wherein the braided shield portion comprises an outer braided shield layer configured to coaxially surround the inner braided shield portion.

14. The coaxial cable of claim 12, wherein an outer surface portion of a non-overlapped portion of the outer conductive foil layer extending from the first lateral region to the second lateral region is free of the sealant.

15. A coaxial cable configured to provide enhanced protection from moisture leaks, comprising:

a braided shield portion configured to encircle an inner conductive foil portion;

a sealed outer conductive foil portion configured to encircle the braided shield portion;

wherein the outer conductive foil portion includes a first lateral portion and a second lateral portion;

wherein the first lateral portion and the second lateral portion are configured to overlap each other to form a circumferential mating portion of the outer conductive foil portion, and wherein a radially outer surface portion of the first lateral portion faces a radially inner surface portion of the second lateral portion at the mating portion;

wherein a sealant is disposed between the radially outer surface portion of the first lateral portion and a radially inner surface portion of the second lateral portion to form a sealed joint portion that is configured to extend longitudinally along a length of the outer conductive foil portion;

wherein the sealed joint portion includes first and second opposite circumferential end portions within the circumferential mating region; and wherein the outer conductive foil layer and the sealed joint portion are collectively configured to prevent moisture that enters an outer jacket from passing the outer conductive foil layer so as to prevent signal loss or damage to a connector that terminates the coaxial cable.

16. The coaxial cable of claim 15, wherein the sealed outer conductive foil portion includes a floodant portion contacting the sealed outer conductive foil portion; and wherein the floodant portion is discontinuous along a length of the sealed outer conductive foil portion such that the floodant portion prevents moisture that enters an outer jacket portion from migrating along the coaxial cable so as to prevent signal loss or damage to a connector that terminates the coaxial cable.

17. The coaxial cable of claim 15, further comprising an inner conductive foil layer, wherein the inner conductive foil layer is configured to coaxially surround an insulator.

18. The coaxial cable of claim 17, wherein the insulator is configured to surround an inner conductor portion.

19. The coaxial cable of claim 18, wherein the inner conductor portion comprises a center conductor that extends along a longitudinal axis of the coaxial cable.

20. The coaxial cable of claim 17, wherein the braided shield layer is configured to coaxially surround the inner conductive foil layer.

21. The coaxial cable of claim 15, further comprising an outer jacket portion, wherein the outer jacket portion is configured to encircle the outer conductive foil portion.

22. The coaxial cable of claim 15, further comprising an inner braided shield layer adjacent to the braided shield layer and encircled by the braided shield layer.

23. The coaxial cable of claim 15, wherein the floodant portion comprises a non-flowing compound material.

24. The coaxial cable of claim 15, wherein an outer surface portion of a non-overlapped portion of the outer conductive foil layer extending from the first lateral region to the second lateral region is free of the sealant.

* * * * *